(No Model.) 2 Sheets—Sheet 2.
W. H. FORBES.
GLASS OR OTHER FURNACE.
No. 498,640. Patented May 30, 1893.
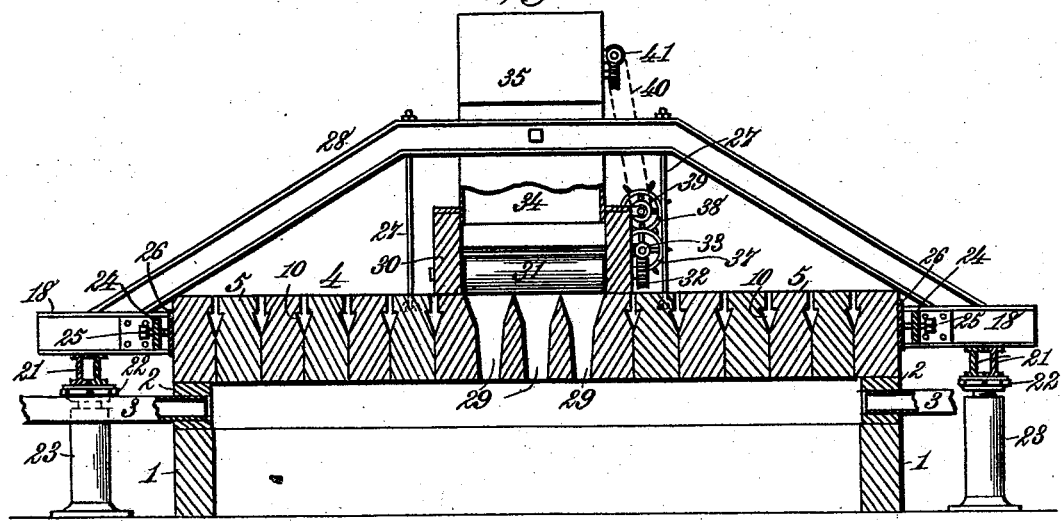
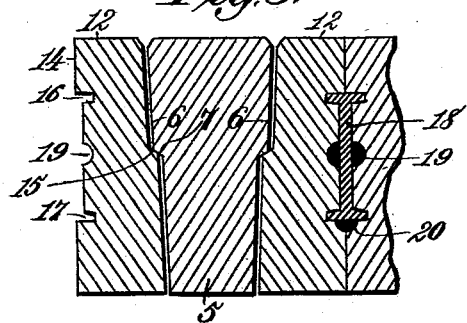
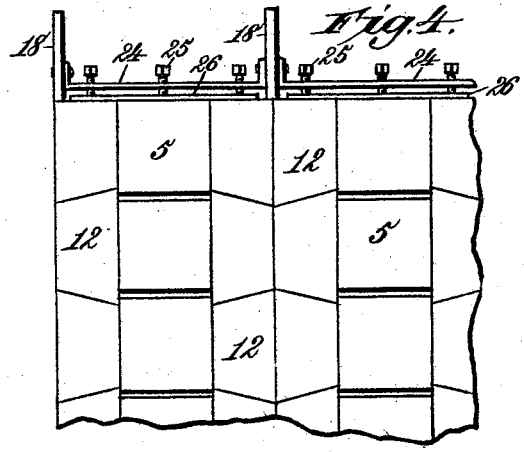
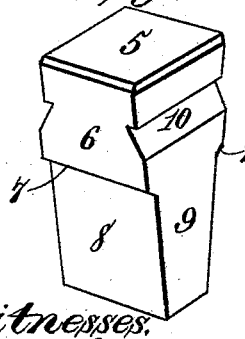
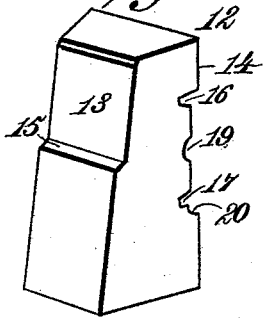
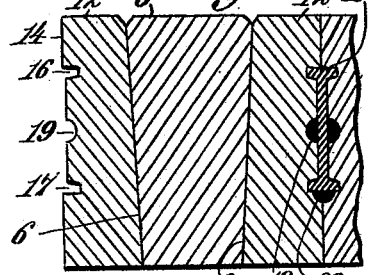
Witnesses.
Robt Everitt,
J. A. Rutherford.
Inventor:
Wilson H. Forbes.
By James L. Norris.
Atty.

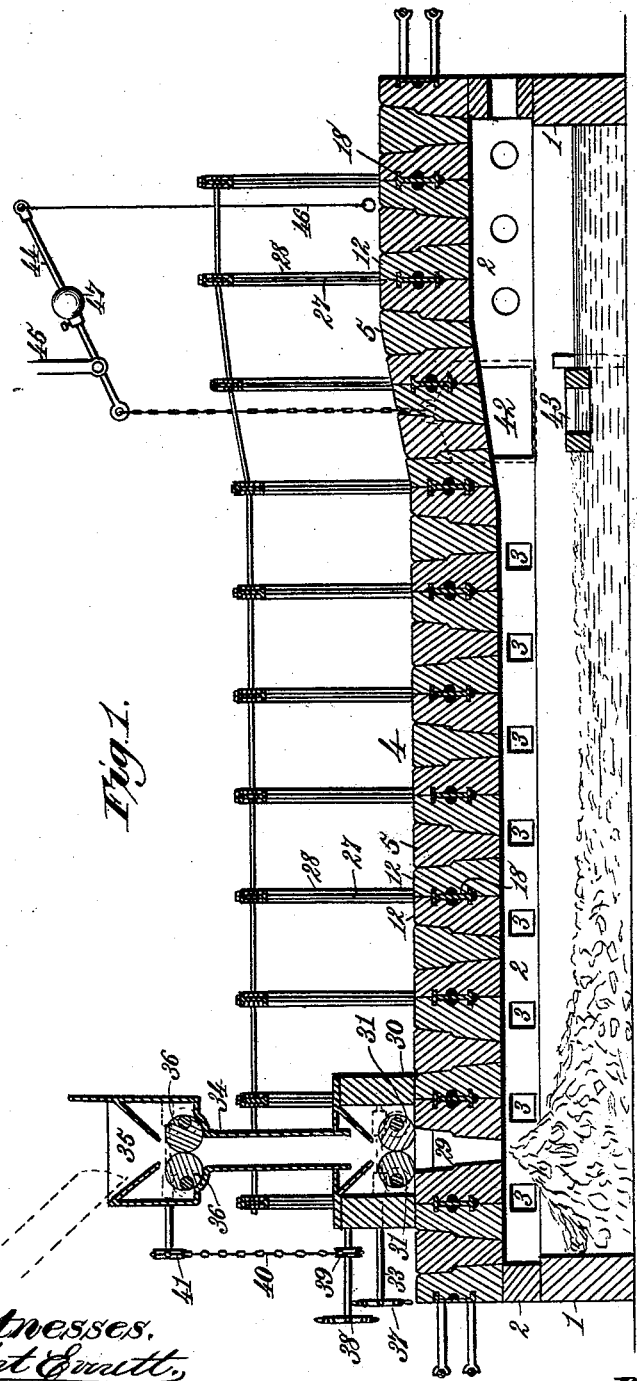

UNITED STATES PATENT OFFICE.

WILSON H. FORBES, OF CHICAGO, ILLINOIS, ASSIGNOR OF ONE-HALF TO PARKER P. SMITH, OF JEANNETTE, PENNSYLVANIA.

GLASS OR OTHER FURNACE.

SPECIFICATION forming part of Letters Patent No. 498,640, dated May 30, 1893.

Application filed January 2, 1892. Serial No. 416,853. (No model.)

*To all whom it may concern:*

Be it known that I, WILSON HENRY FORBES, a citizen of the United States, residing at Chicago, in the county of Cook and State of Illinois, have invented new and useful Improvements in Glass or other Furnaces, of which the following is a specification.

My invention relates to glass or other furnaces, and especially to that type known as tank furnaces, in which the enclosure is effected, in part, by a crown or cap.

It is one purpose of my invention to provide a crown for a furnace having such construction that the expansion and contraction produced by variations of temperature shall take place within the body, or mass, composing the crown or cap, and shall be compensated therein, thereby preventing the severe strains to which the structure supporting the crown is often subjected.

It is my purpose also to provide a crown furnace or a furnace inclosed in part by a cap or crown, having combined therewith mechanical means whereby the crown shall receive substantially uniform and adjustable support at all points of its margin to prevent warping or cracking, due to unequal strain, and whereby also the cap or crown may be leveled if necessary or sustained at any one or more points to permit a renewal of the filling or wall beneath it.

It is my further purpose to improve the construction of glass or other furnaces, to provide improved means for sustaining the weight of the crown or cap, to provide for the temporary removal of one or more of the component parts of the cap or crown, to simplify and improve the construction of the latter, to provide novel and improved devices for closing the charging opening in the crown, and to combine with the latter transverse supports intermediate of adjacent faces of the masonry composing said crown, means being provided for preventing excessive heat of said supports.

The invention consists to these ends in the novel features of construction and new combinations of parts hereinafter fully set forth and then pointed out particularly in the claims concluding this specification.

To enable others skilled in the art to make and use my said invention I will proceed to describe the same in detail, reference being had to the accompanying drawings, in which—

Figure 1, is a vertical longitudinal section of a glass furnace constructed in accordance with my invention. Fig. 2, is a transverse vertical section of the same. Fig. 3, is a detail section taken in the direction of the length of the furnace. Fig. 4, is a partial plan view of the same. Fig. 5, is a detail perspective of one of the key-blocks used in the construction of the crown. Fig. 6, is a detail perspective of one of the saddle-blocks used in the crown of the furnace. Fig. 7, is a detail section showing a modified construction.

In the said drawings the reference numeral 1 indicates the longitudinal breast walls of the furnace, which are of the usual form and may be of any suitable refractory material, though I prefer to employ German clay. In height and other dimensions these walls are of ordinary construction, and they are topped by a filling 2, of silica brick, or other refractory material, which extends from the glass surface to the lower face of the crown. In this filling 2 are inserted the flues 3 which are of the usual form and arrangement and need no description. I insert the flues in the filling 2, instead of running them through the margin of an arched crown, as frequently done heretofore.

The reference numeral 4 indicates the crown, which I construct of parallel courses of key-blocks, alternating with double courses of saddle-blocks, in the following manner. The key-blocks 5, shown separately in Fig. 5, are molded from a composition of German clay and silica sand, or, if preferred, may be made from German clay, silica sand and forge-cinders, either composition being suitable for a glass-furnace. For other furnaces I use any ordinary, well-known refractory compound. The key-block is substantially cubical throughout its upper portion, but two of the opposite sides of this substantially cubical part will have a slight convergence from the top downward, as shown in Fig. 3, these converging sides 6 lying in the longitudinal line of the crown. The length of this nearly cubical part is usually somewhat less than half the length of the block.

At the lower extremities of the two slightly converging sides 6 are formed shoulders 7, which extend inward, toward the central transverse line of the block, with a downward inclination, and from these shoulders the opposite faces 8 converge gradually to the lower end of the block, the two remaining faces 9 being parallel, or substantially so, from top to bottom of the block. The lower portion of said block, therefore, below the shoulders 7, constitutes practically a truncated wedge, having a small angle at its apex.

In the two parallel faces 9, a little below the top of the block, are formed channels 10 parallel with the top, said channels being formed by an upper, horizontal cut extending inward a suitable distance, and a lower upwardly inclined cut, thereby forming undercut shoulders which lie in the transverse line of the key-block.

The saddle blocks 12 shown in detail in Fig. 6, are symmetrical in form, but not equiangular. In plan view each saddle-block is substantially trapezoidal, the two edges which lie in the longitudinal line of the crown being parallel, and the other edges divergent, as best shown in Fig. 4.

From the face 13 of the saddle block projects a shoulder 15, having a width and downward inclination corresponding with the width and upward inclination of the shoulder 7 in the key-block, and the said face 13 also corresponds in slight downward divergence from a vertical plane below the shoulders 15, with the slight downward convergence of the faces 8 of the key-blocks. The proportions are such that the length of the shoulder 15, as well as the width of the face 13 is less than the length of the shoulder 7, and the width of the face 8 of the key-block.

Opposite the face 13 of the saddle-block the face 14, is vertical, or at right angles with the surface of the block and in this vertical face a little below the top of the block, is formed a transverse channel 16 and at a proper distance beneath the latter a similar channel 17, the face between these channels being slightly set in, so that when brought into surface engagement with the correspondingly formed face 14 of a similar block, space will be provided for the insertion of a girder 18, the ends of which project beyond the lateral margins of the crown for a purpose presently to be shown.

In each face 14, between the channels 16 and 17, is formed a transverse, half-round or other suitable form of channel 19, and directly beneath and intersecting the lower edge of the channel 17 is a substantially quadrantal channel 20, which unites with a similar channel in the face of the contacting block to form a half-round, or other suitable shaped passage, directly beneath the lower flange of the girder, the channels 19 lying on opposite sides of the web. These channels give passage to air by which the girders are so far cooled as to prevent melting, or such degree of softening as might impair the supporting strength of the girder.

The saddle blocks are all substantial duplicates, one of another, excepting those lying at the margins of the crown, the external faces of which are at right angles with their transverse faces.

In forming the crown, the saddle-blocks are laid in double courses, their widest vertical faces 14 being in contact in each alternate pair, while in the remaining pairs the said vertical faces are of narrow width, thereby breaking joints with the key-blocks, which are laid in single courses alternating with the double courses of saddle-blocks. The trapezoidal shape given to the latter greatly facilitates their removal and replacement, whenever the same may be necessary. The crown, thus built up, is of the length and breadth ordinarily seen in glass furnaces, but in thickness it is very considerably in excess of the common construction, the purpose being to prevent excessive radiation of heat, and thereby economize the consumption of fuel, and to avoid the presence of very high temperatures immediately above the surface of the crown, and thereby render it possible to do necessary work upon the crown without compelling the operatives to leave the same at very short intervals, owing to the intense heat.

From each double course of saddle-blocks project the ends of the girder 18, which rest upon longitudinally arranged girders 21, the latter being supported at suitable frequent intervals by jacks 22, the threaded stems of which are meshed in threaded apertures in strong pedestals 23, which sustains the entire weight of the crown, or substantially so. The vertical adjustability of the jacks and their arrangement at frequent intervals, secures a practically uniform support for the crown at every point, without regard to the possible settling of the foundations or other causes which may, in ordinary constructions, cause a failure in the vertical support at one or more points and thereby render the crown liable to warp or crack.

Between the girders 18, upon the lateral margins of the crown, are arranged strong plates 24, having angular ends which are bolted to the vertical webs of the girders 18. Through these plates are tapped bolts 25 which bear upon plates 26, lying against the vertical external faces of the key-blocks and saddle-blocks, to draw the parts together after expansion and bind the whole in a coherent mass. The crown is also bound together by trusses at the sides and ends, and it receives vertical support by means of truss-rods 27 dropped from transverse truss-braces 28, arranged above the saddle block courses, the truss-rods being dropped upon each side of the longitudinal center of the crown.

At the end of the crown or near the same, are the openings 29 for charging the furnace with sand. These openings are surrounded by a curb 30, within which are arranged cylindrical gates 31, mounted on eccentric axes the shafts projecting, at one end, through the curb and being provided with worm gear 32, with which a reversely threaded worm shaft 33 meshes. Above the hopper which guides the charge between these gates, rises the filling chamber 34, passing through a top by which the curb is closed, and provided at its upper end with a hopper 35, within which are arranged cylindrical gates 36, eccentrically mounted, their shafts being geared and operated in a manner substantially similar to the shafts of the gates 31. The latter are actuated by a hand wheel 37, (Fig. 1) and the gates 36 are actuated from a second hand-wheel 38, its shaft provided with a chain-wheel 39, geared by a chain 40, to a sprocket 41, on the worm shaft of the upper gates. The chamber 34, being filled and the gates 36 closed, the lower gates 31 are opened and the charge is thrown into the furnace.

A gate 42 is provided for the introduction of the float 44, said gate being so formed as to fill a suitable opening in the filling 2, over one of the breast-walls of the furnace. It is arranged in any well known manner to have a vertical movement in said opening, and is raised and lowered by a lever 44, fulcrumed upon any suitable bracket 45 and operated by a pull 46. The power end of the lever will preferably be weighted as shown at 47, to counterbalance a part of the weight of the gate.

The cylindrical gates are made from the best German clay, with silica sand or other refractory material of the kind employed in the crown.

The holding-bolts 25 are adjusted to permit expansion and set up to take up the lateral or transverse contraction of the crown. The longitudinal expansion and contraction is provided for by the construction of the saddle blocks and key-blocks, the shoulders 7 of the latter slipping slightly upon the shoulders 15 of the former, thereby producing a very slight drop, or descent, of the key-block whenever contraction takes place, and a corresponding rise when the parts are driven together by expansion.

The channels 10 are provided to permit the insertion of a key, should it be necessary to raise one of the blocks from the crown. The key-blocks being removed in this manner, to the number of two or more, as the case may be, the saddle-blocks may be displaced laterally or longitudinally without difficulty.

My invention is applicable without any material change, to iron, steel and other furnaces, as well as to tunnel kilns for burning brick and kilns for other purposes. The construction of the crown is well adapted also to flint glass furnaces, the only variation needed in applying my invention to furnaces of this type being to give the crown the circular form and seat the supporting girders in the furnace wall, no adjustable supports being necessary in this case. I am able thus to avoid the waste space produced by the arch or dome-shape of the crowns of flint glass furnaces, as now constructed, and to provide a much more durable and permanent structure than heretofore used.

The crown having the construction described and shown may be used with any form of filling or charging devices other than those shown in this application, and I do not limit my invention to the employment of any particular form of charging mechanism, or to any specific means for operating the float gate.

As the charging devices are not inseparable from the other novel features described, I make no claim thereto in this application.

What I claim is—

1. A glass or other furnace having a crown composed of separable key-blocks of refractory material, laid in single courses which alternate with double courses of saddle-blocks which are substantially trapezoidal, in horizontal section, with the parallel edges, or sides, lying parallel with the longitudinal line of the crown, said crown being supported by girders, the key-blocks having inclining shoulders resting upon oppositely inclined shoulders on the saddle-blocks, the contacting faces of the key-blocks and saddle-blocks having a downward convergence and divergence, respectively, substantially as described.

2. A glass or other furnace having a crown composed of single courses of key-blocks alternating with double courses of saddle-blocks, of substantially trapezoidal shape in horizontal section, the latter being sustained by girders laid between their contacting faces, and the key-blocks sustained by the saddle-blocks, substantially as described.

3. In a glass or other furnace, a crown formed of separable refractory blocks, sustained by girders lying in spaces between the contacting faces of said blocks, the latter being provided with air-passages adjacent to the girders, to cool the latter, substantially as described.

4. In a glass, or other furnace, a crown composed of a series of courses of refractory blocks, a series of girders each supporting a double course of said blocks and vertically, independently adjustable supports, which sustain the projecting ends of said girders, substantially as described.

5. In a glass, or other furnace, a crown composed of separable refractory blocks, a series of sustaining girders having ends projecting from the margins of the crown, and a series of vertically and independently adjustable supports for said girders arranged beneath the projecting ends of said girders and outside the breast walls of the furnace, substantially as described.

6. In a glass or other furnace, the combination with a crown composed of a series of separable blocks, of a series of girders laid between the courses and projecting from the margins of the crown, and a series of jacks having their threaded stems arranged in pedestals beneath the projecting ends of the girders, to afford adjustable vertical support for the latter, substantially as described.

7. In a glass or other furnace, a crown, a filling arranged beneath the marginal portion of the crown, and vertically adjustable devices for supporting said crown and removing its weight from the filling, substantially as described.

8. In a glass-furnace, a flat crown composed of a series of courses of refractory blocks, crown-sustaining girders laid between said courses, the ends of said girders projecting beyond the margin of the crown, and a series of suitable, vertically adjustable supports for said girders, substantially as described.

9. In a glass-furnace, having a crown composed of courses of saddle-blocks alternating with courses of key-blocks, the combination with the saddle-block-courses of girders supporting the same and having their ends projecting beyond the lateral margins of the crown, and supports sustaining said projecting ends and capable of independent, vertical adjustment, substantially as described.

10. In a glass-furnace having a crown formed of double courses of saddle-blocks which alternate with single courses of key-blocks, the combination with the saddle-block-courses of girders placed in each double course thereof, each girder lying in a channel in the vertical, adjacent or contacting faces of the two series of saddle-blocks forming each double course thereof, the ends of said girders projecting beyond the lateral margins of the crown, and a double series of supports sustaining said projecting ends and capable of independent, vertical adjustment, substantially as described.

In testimony whereof I have hereunto set my hand and affixed my seal in presence of two subscribing witnesses.

WILSON H. FORBES. [L. S.]

Witnesses:
JAMES L. NORRIS,
JAMES A. RUTHERFORD.